US 008575240B2

(12) United States Patent
Freund et al.

(10) Patent No.: US 8,575,240 B2
(45) Date of Patent: Nov. 5, 2013

(54) METHOD FOR QUALITATIVELY AND QUANTITATIVELY IDENTIFYING BULK GOODS

(75) Inventors: Torsten Freund, Limburgerhof (DE); Simon Nord, Karlsruhe (DE); Marc Rudolf Jung, Worms (DE); Hans-Peter Kaub, Altrip (DE); Tina Schröder-Grimonpont, Rheinzabern (DE); Dirk Schmitt, Leimen St. Ilgen (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/515,974

(22) PCT Filed: Dec. 16, 2010

(86) PCT No.: PCT/EP2010/069983
§ 371 (c)(1),
(2), (4) Date: Jul. 24, 2012

(87) PCT Pub. No.: WO2011/073354
PCT Pub. Date: Jun. 23, 2011

(65) Prior Publication Data
US 2013/0035422 A1 Feb. 7, 2013

(30) Foreign Application Priority Data

Dec. 18, 2009 (EP) .................... 09179832

(51) Int. Cl.
C04B 24/26 (2006.01)
C08F 2/44 (2006.01)
B05D 1/02 (2006.01)
F21V 9/16 (2006.01)

(52) U.S. Cl.
USPC .......... 524/2; 427/427.4; 250/459.1; 524/849

(58) Field of Classification Search
USPC ................. 524/2, 849; 427/427.4; 250/459.1
See application file for complete search history.

(56) References Cited

U.S. PATENT DOCUMENTS

| 4,654,165 A | 3/1987 | Eisenberg |
| 4,680,332 A | 7/1987 | Hair et al. |
| 5,324,356 A * | 6/1994 | Goodwin ............. 106/638 |
| 5,540,763 A | 7/1996 | Siegert |
| 5,710,197 A | 1/1998 | Fischer et al. |
| 6,455,157 B1 | 9/2002 | Simons |
| 6,541,032 B1 * | 4/2003 | Medelnick et al. ........... 424/484 |
| 6,727,318 B1 | 4/2004 | Mathauer et al. |
| 2002/0066543 A1 | 6/2002 | Lilly |
| 2002/0131941 A1 | 9/2002 | Habeck et al. |
| 2005/0075453 A1 | 4/2005 | Mathauer et al. |
| 2006/0009571 A1 | 1/2006 | Dyllick-Brenzinger et al. |
| 2010/0119697 A1 | 5/2010 | Baran, Jr. |
| 2010/0291474 A1 | 11/2010 | Baran, Jr. |

FOREIGN PATENT DOCUMENTS

| CA | 1 212 021 | 9/1986 |
| DE | 26 51 528 | 5/1977 |
| DE | 33 01 357 C1 | 8/1984 |
| DE | 44 36 892 A1 | 4/1996 |
| EP | 0 198 426 A1 | 10/1986 |
| EP | 0 566 448 A1 | 10/1993 |
| EP | 0 669 392 A1 | 8/1995 |
| EP | 0 691 390 A2 | 1/1996 |
| EP | 0 692 517 A1 | 1/1996 |
| EP | 1 191 041 A2 | 3/2002 |
| GB | 1 568 699 | 6/1980 |
| WO | WO99/40123 | 8/1999 |
| WO | WO 99/52708 | 10/1999 |
| WO | WO 02/46528 A1 | 6/2002 |
| WO | WO 03/044276 A1 | 5/2003 |
| WO | WO 03/046065 A2 | 6/2003 |
| WO | WO 2004/037867 A1 | 5/2004 |
| WO | WO 2007/130190 A1 | 11/2007 |

OTHER PUBLICATIONS

PCT/EP2010/069983—International Search Report, May 9, 2011.
PCT/EP2010/069983—International Written Opinion, May 9, 2011.
PCT/EP2010/069983—International Preliminary Report on Patentability, Jul. 4, 2012.

* cited by examiner

Primary Examiner — William Cheung
(74) Attorney, Agent, or Firm — Curatolo Sidoti Co., LPA; Joseph G. Curatolo; Salvatore A. Sidoti

(57) ABSTRACT

Identification and quantification of mass-produced goods in articles, a dye-containing polymer dispersion having been added to the mass-produced goods. The polymer dispersions contain particles which are coded by a mixture of dyes, and the polymer dispersion particles are quantitatively determined.

16 Claims, No Drawings

METHOD FOR QUALITATIVELY AND QUANTITATIVELY IDENTIFYING BULK GOODS

CROSS REFERENCE TO RELATED APPLICATION

This application is a national stage application International Application No. PCT/EP2010/069983, filed 16 Dec. 2010, which claims priority from European Patent Application Ser. No. 09179832.2, filed 18 Dec.2009, from which applications priority is claimed, and which are incorporated herein by reference.

The present invention relates to a method for identifying and quantifying mass-produced goods in articles, a use of fluorescence-marked polymer dispersions and construction materials which contain fluorescence-marked polymer dispersions.

BACKGROUND OF THE INVENTION

Mass-produced goods are products or goods which are sufficiently well known and which are produced or transported in large quantity. They may also be designated as utility goods and are characterized in that they are supplied in large quantities and have to fulfil certain basic specifications. These include the loose bulk and liquid materials, which do not permit a quantity to be stated in pieces.

Mass-produced goods are classified, according to their physical state, as dry and wet mass-produced goods and gaseous mass-produced goods. These classifications give direct indications of the production factors necessary for transport, transfer and storage activities. They are therefore of high practical relevance for the participants in the transformation processes of international logistics. Wet mass-produced goods (e.g. crude oil, mineral oil products) are transported by tankers at sea and vessels on inland waterways together with goods wagons and lorries, transferred, in some cases also with suction installations, and generally stored in silos and sometimes in the open air. Gaseous mass-produced goods are logistically transformed similarly to the wet mass-produced goods—but with different technologies in detail. The logistical flow of mass-produced goods is generally measured in weights and volumes. Mass-produced goods are not packed but they can be converted into piece goods by the introduction into packing materials (e.g. bags, barrels, cartons or bottles) by means of load carriers (i.e. containers). Piece goods are semifinished and/or finished products, in some cases also packed mass-produced goods. Historically, they are generally held together and protected by packing materials, such as bags or barrels, and immediately loaded onto the means of transport.

Utility goods or consumer goods are consistently demanded by a large user group (consumers or processors) and as a rule produced over a relatively long period. They may be production goods (e.g. ores, wood, steel, sheet metal, pipes) and consumer goods (e.g. household products, textiles).

They comprise liquid mass-produced loads, such as mineral oil, liquefied gas, liquefied natural gas and liquid mineral oil products. The solid mass-produced load is divided into granular form (bulk material), such as ore, coal, bauxite, phosphate, cement, cereal, or into solid mass-produced material in the form of pieces (piece goods), such as tree trunks, paper, automobiles or steel.

The merchandise mentioned in trade, such as products and the finished goods mentioned in agriculture and horticulture, becomes articles in trade.

Marketable goods is a collective designation for the commercial materials sold by tradesmen. Suitable objects of trade in the widest sense are commercial goods of all kinds, raw materials, agricultural products, capital goods, consumer goods, currencies and securities. Products are self-contained functional articles consisting of a number of groups and/or parts (e.g. machines, devices) as end results of manufacture.

In particular, firstly the use of construction materials is subject to standards and secondly there are frequently defects as a result of the use of a construction material which is unsuitable for a specific application in compliance with standards and an unsuitable dose of multicomponent systems. Defective structural parts are the result, the damage often becoming obvious in the years after completion of a construction project.

It was therefore the object of the present invention quantitatively and qualitatively to determine the type and origin of materials used and thus to carry out the quality assurance of the construction material immediately during and after its use. The detection should be possible on a completed structure.

The method was developed for construction materials but is not limited to such.

This object was achieved by the provision of a method for identifying mass-produced goods in articles, a dye-containing polymer dispersion having been added to the mass-produced goods, wherein particles are coded by a mixture of dyes and the polymer dispersion particles being quantitatively determined. The coding is preferably effected by preparing a polymer dispersion in which each individual dispersion particle comprises a uniform pattern of dyes which is unmistakable for the respective dispersion. The pattern is determined by the number of dyes available altogether and their relative concentration in the polymer particle. The pattern can be detected by spectroscopic and/or microscopic methods.

It has now surprisingly been found that a quantitative and qualitative type of the origin of the materials used can be determined by marking of mass-produced goods in articles. The markers which are associated with a quantitatively high degree of marking for mass-produced goods could be economically produced thereby. The marking, according to the invention, of mass-produced goods can be effected by metering the marker at different points during their production process.

DETAILED DESCRIPTION OF THE INVENTION

Articles are frequently produced with the use of mass-produced goods. Regarding the processing, it is often difficult if not completely impossible to detect with satisfactory reliability the type, origin and the amount used of the mass-produced material employed in the article.

In a preferred embodiment of the invention, liquid and solid mass-produced goods are used for identifying and quantifying mass-produced goods. Here, the mass-produced material can be divided into two categories, into liquid mass-produced material, such as mineral oil, liquefied gas, liquefied natural gas and liquid mineral oil products, and solid mass-produced material. The solid mass-produced load is divided into granular form (piece goods), such as ore, coal, bauxite, phosphate, cement, cereal, and solid mass-produced goods in piece form (piece goods), such as tree trunks, paper, automobiles or steel.

WO-A-99/52708 discloses a method for marking gaseous, liquid or solid materials, a sufficient amount of coloured microparticles and/or nanoparticles which are bound to carrier microparticles being added to a gaseous, liquid or solid material which is subsequently to be identified. The particles used consist, for example, of crosslinked polystyrene and have a diameter of about 5.5 μm. The particles are coloured or coded, for example, with three different fluorescent dyes in eight different concentrations of the dyes so that 512 different groups of coded particles are obtained. The individual groups can be identified, for example, with the aid of a cytometer. The coded particles are used for marking substances, e.g. sodium chloride crystals, in order thus, for example, to verify the manufacturer, the production batch and the production date.

In particular, the liquid mass-produced goods may be concrete admixtures and cement additives.

Concrete admixtures are substances which are dissolved or suspended in water and are mixed with the concrete in order to modify the properties of the fresh or solid concrete, for example, processability, setting behaviour, hardening or durability, by physical and/or chemical effects. The addition of the substances is effected either directly during the production in the concrete factory or is effected after delivery on the building site. Concrete admixtures are as a rule added in liquid form and in small amounts. The addition, based on the cement weight, is in general in the range of 0.2-2%. Concrete plasticizers or superplasticizers are the most frequently used admixtures. Plasticizers also serve the production of concrete having flowable consistency. Concrete plasticizers improve the processability of the concrete or, with the same processibility, reduce the water requirement, which leads to an increase in the compressive strength and the impermeability. As a result of the addition of concrete plasticizers, the fresh concrete becomes more fluid and hence more easily processible. For a certain processibility, the required amount of water can be reduced thereby.

Grinding auxiliaries are understood as meaning the grinding media and other additives, such as, for example, liquids in the case of wet grinding. Generally used grinding media are balls, since they have the geometry which is most resistant kinetically and with respect to abrasion and a favourable volume:surface area ratio. Cement, Portland cement, beryllium oxide, limestone, gypsum, clay and bauxite can be treated with grinding auxiliaries.

In the preparation of pretreated or untreated minerals, these are usually ground to give relatively small particles. Grinding auxiliaries are often used here in order to increase the grinding speeds or the fineness of the particles at a given working speed. Minerals which are ground are naturally occurring inorganic minerals, such as phosphate rock, partly processed minerals, such as concentrated iron ore, and mixtures of minerals, such as cement, clinker or ceramic materials, together with the grinding auxiliaries.

The solid mass-produced goods are preferably concrete, cement and clinker.

Concrete is a mixture of cement, rock particles or concrete aggregate (sand and gravel or chips) and mixing water. It may also contain concrete additives and concrete admixtures. Reinforced concrete or prestressed concrete can be produced together with structural steel or prestressing steel. The cement serves as a binder in order to hold together the other constituents. The strength of the concrete arises through crystallization of the clinker constituents of the cement, resulting in the formation of very small crystal needles which intermesh firmly with one another. The concrete properties are dependent on the composition (cement type, cement content, amount of mixing water (water-cement value), particle grade, quality of the aggregates, additives and admixtures, powder content), processing (compacting, aftertreatment).

The preferred cement is an inorganic, finely ground, hydraulically acting binder for mortar and concrete. On addition of water, the cement paste forming hardens through hydration to give water-resistant and three-dimensionally stable hardened cement paste. Cement substantially consists of compounds of calcium oxide (CaO, lime) with silicon dioxide ($SiO_2$, silica), aluminium oxide ($Al_2O_3$, alumina) and iron oxide ($Fe_2O_3$). Cement is used for the production of concrete, mortar, precast concrete and finished articles. The main types of cement comprise Portland cement, Portland composite cements, blast furnace cements, puzzolana cement and composite cement.

The raw materials (as a rule limestone, clay, sand and iron ore) are excavated in quarries, precomminuted in crushers and transported to the cement factory. All raw materials are ground together in a raw mill and at the same time dried. The resulting raw meal is then calcined in a rotary furnace at temperatures of about 1450° C. to give so-called clinker, which is then cooled down to a temperature below 200° C. in a cooler. The clinker is predominantly stored in silos or in warehouses and homogenized again. The calcination of the raw meal to give clinker results in new chemical compounds which permit the hydraulic hardening of the cement.

In a preferred embodiment, the polymer dispersions according to the invention can be used in a particle size distribution having a mean diameter of 50 nm to 500 μm.

A colloidally stable dispersion of polymer particles in an aqueous phase is designated as polymer dispersions or polymer latex. The diameter of the polymer particles may be between a few 10 nanometers and a few microns. Depending on the particle diameter and polymer content, polymer dispersions appear as more or less turbid to white liquids. The colloidal stability of the dispersion is generally achieved by surface-active substances, such as surfactants or protective colloids. Polymer dispersions can be prepared by various polymerization processes (e.g. emulsion polymerization, suspension polymerization) directly from the monomers or by dispersing of a polymer.

WO-A-99/40123 discloses a process for the preparation of aqueous polymer dispersions, the dispersed polymer particles of which contain an organic dye distributed homogeneously, i.e. in molecular disperse form. Such aqueous dispersions are prepared by miniemulsion polymerization, by polymerizing ethylenically unsaturated monomers, which contain a dissolved organic dye, in the form of an oil-in-water emulsion in the presence of free radical polymerization initiators, the disperse phase of the emulsion being formed substantially by dye-containing monomer droplets having a diameter of <500 nm. In an advantageous embodiment of the invention, monomer mixtures which contain crosslinking monomers are used in the polymerization. The polymer dispersions are stable to sedimentation. The dispersed particles have a mean particle diameter of 100 to 400 nm. They can be obtained with the aid of conventional drying methods from the aqueous dispersions. The dye-containing polymer dispersions are used, for example, for pigmenting high molecular weight organic and inorganic materials, for pigmenting printing inks and inks for inkjet printing.

WO-A-2004/037867 discloses aqueous polymer dispersions which contain alkyl diketenes and are obtainable by miniemulsion polymerization of hydrophobic monoethylenically unsaturated monomers in the presence of alkyl diketenes. These dispersions are used as sizes for paper, as water repellents for leather, natural and/or synthetic fibres and textiles.

In WO 2007/130190, Baran reports on a dispersion composition and process which contains a solution and surface-modified, fluorescent, inorganic nanoparticles in the solution. The compositions and coatings can be used for marking surfaces.

WO 03/046065 discloses polymer dispersions which contain water, at least one polymer which can be prepared by emulsion polymerization and at least one element selected from the group consisting of Li, B, Co, Cu, Mo, Ni, Pb and/or a salt of such an element or a mixture of two or more thereof.

Further colorant-containing polymer dispersions, the colorant-containing polymer particles of which have a mean particle diameter below 1000 nm, are disclosed in EP-A-1 191 041. Suitable colorants in addition to organic dyes are also UV absorbers and optical brighteners. They are prepared by dissolving a colorant in at least one ethylenically unsaturated monomer, emulsifying this solution in water with formation of a conventional macroemulsion, homogenizing the macroemulsion with formation of a miniemulsion having a mean droplet size below 1000 nm and polymerizing the miniemulsion in the presence of a free radical polymerization initiator, 0.1 to 20% by weight of at least one nonionic surface-active compound and 1 to 50% by weight, based in each case on the monomers used, of at least one amphiphilic polymer. The polymer particles contain 0.5 to 50% by weight of at least one organic dye, optical brightener or UV absorber homogenously distributed, which is to be understood as meaning that the organic colorants are dissolved in monomolecular form in the polymer matrix or are present in the form of bimolecular or higher molecular weight aggregates.

In a further preferred embodiment of the invention, the polymer dispersions comprise hydrophobic monomers from the group consisting of $C_1$- to $C_{18}$-alkyl esters of acrylic acid, $C_1$- to $C_{18}$-alkyl esters of methacrylic acid, vinyl acetate, vinyl propionate, vinyl butyrate, styrene, chlorostyrene and/or α-methylstyrene, methyl acrylates, maleic acid and a combination of these monomers.

Suitable ethylenically unsaturated monomers are, for example
(a) hydrophobic monomers from the group consisting of $C_1$- to $C_{18}$-alkyl esters of acrylic acid, $C_1$- to $C_{18}$-alkyl esters of methacrylic acid, vinyl acetate, vinyl propionate, vinyl butyrate, styrene, chlorostyrene and/or α-methylstyrene,
(b) optionally hydrophilic monomers from the group consisting of ethylenically unsaturated $C_3$- to $C_6$-carboxylic acids, vinylsulphonic acid, 2-acrylamido-2-methylpropanesulphonic acid, sulphopropyl acrylate, sulphopropyl methacrylate, styrenesulphonic acid, salts of said acids, acrylonitrile, methacrylonitrile, $C_1$- to $C_8$-hydroxyalkyl esters of $C_1$- to $C_6$-carboxylic acids, di-$C_1$- to $C_3$-alkylamino-$C_2$- to $C_4$-alkyl acrylates, di-$C_1$- to $C_3$-alkylamino-$C_2$- to $C_4$-alkyl methacrylates, acrylamide, methacrylamide, N-vinylformamide and/or N-vinylpyrrolidone and
(c) optionally at least one crosslinking monomer having at least two double bonds in the molecule.

The monomers of group (a) can be used alone, as a mixture of one another and in combination with the monomers (b) and/or (c) in the suspension polymerization. Examples of monomers of group (a) are methyl acrylate, ethyl acrylate, isopropyl acrylate, n-propyl acrylate, n-butyl acrylate, isobutyl acrylate, tert-butyl acrylate, sec-butyl acrylate, pentyl acrylate, n-hexyl acrylate, octyl acrylate, 2-ethylhexyl acrylate, decyl acrylate, dodecyl acrylate, palmityl acrylate, stearyl acrylate, methyl methacrylate, ethyl methacrylate, isopropyl methacrylate, n-propyl methacrylate, n-butyl methacrylate, isobutyl methacrylate, sec-butyl methacrylate, tert-butyl methacrylate, pentyl methacrylate, n-hexyl methacrylate, cyclohexyl methacrylate, heptyl methacrylate, 2-ethylhexyl methacrylate, octyl methacrylate, decyl methacrylate, dodecyl methacrylate, palmityl methacrylate and stearyl methacrylate and vinyl acetate, vinyl propionate, vinyl butyrate, styrene, chlorostyrene and/or α-methylstyrene. Preferably used monomers of this group are methyl methacrylate and styrene.

Monomers of group (b) which are optionally used for the hydrophilic modification of the polymers are selected, for example, from the group consisting of the ethylenically unsaturated $C_3$- to $C_6$-carboxylic acids, vinylsulphonic acid, 2-acrylamido-2-methyl-propanesulphonic acid, sulphopropyl acrylate, sulphopropyl methacrylate, styrene-sulphonic acid, salts of said acids, acrylonitrile, methacrylonitrile, $C_1$- to $C_8$-hydroxyalkyl esters of $C_1$- to $C_6$-carboxylic acids, di-$C_1$- to $C_3$-alkylamino-$C_2$- to $C_4$-alkyl acrylates, di-$C_1$- to $C_3$-alkylamino-$C_2$- to $C_4$-alkyl methacrylates, acrylamide, methacrylamide, N-vinylformamide and/or N-vinylpyrrolidone.

Examples of ethylenically unsaturated carboxylic acids are acrylic acid, methacrylic acid, crotonic acid, maleic acid, fumaric acid, itaconic acid and vinylacetic acid. The ethylenically unsaturated carboxylic acids and the monomers containing sulpho groups can be used in the polymerization in the form of the free acids and in a form partly or completely neutralized with alkali metal bases, alkaline earth metal bases, ammonia or amines. In general, the sodium, potassium or ammonium salts of acidic monomers are used. The acidic monomers can, however, also be neutralized with amines, such as butylamine, morpholine, ethanolamine, diethanolamine or triethanolamine, and used in the polymerization in partly or completely neutralized form. Among the hydroxyalkyl esters, 2-hydroxyethyl acrylate, 2-hydroxyethyl methacrylate, hydroxypropyl acrylate, hydroxybutyl acrylate and 2-hydroxypropyl methacrylate are particularly suitable.

Examples of basic monomers are dimethylaminoethyl acrylate, dimethylaminoethyl methacrylate, dimethylaminopropyl acrylate, dimethylaminopropyl methacrylate, diethylaminoethyl acrylate, diethylaminoethyl methacrylate, di-n-propylaminoethyl acrylate and di-n-propylaminoethyl methacrylate. The basic monomers can be used in the polymerization as a free base, as a salt with mineral acids, saturated carboxylic acids or sulphonic acids, such as p-toluenesulphonic acid or benzenesulphonic acid, and in quaternized form (e.g. quaternized with methyl chloride, ethyl chloride, n-propyl chloride, dimethyl sulphate, n-hexyl chloride, cyclohexyl chloride or benzyl chloride).

The monomers of group (b) can be used individually or in combination in the polymerization. Acrylic acid, methacrylic acid, acrylamide, methacrylamide, vinylformamide and N-vinylpyrrolidone are preferably used from this group.

Crosslinking monomers having at least two double bonds in the molecule are used as monomers of group (c). Examples of such monomers are esters of polyhydric alcohols and ethylenically unsaturated carboxylic acids, such as acrylic acid or methacrylic acid, e.g. ethylene glycol diacrylate, ethylene glycol dimethacrylate, butanediol diacrylate, butanediol dimethacrylate, hexanediol diacrylate, hexanediol dimethacrylate, acrylates and methacrylates of polyalkylene glycols, such as polyethylene glycols, polypropylene glycols or block copolymers of ethylene oxide and propylene oxide having molar masses of, for example, 100 to 5000, allyl acrylate, allyl methacrylate, trimethylolpropane triacrylate, trimethylolpropane trimethacrylate, pentaerythrityl triacrylate, pentaerythrityl trimethacrylate, pentaerythrityl tetraacrylate, pentaerythrityl tetramethacrylate, divinylbenzene, divinylurea and methylenebisacrylamide. Preferably, allyl methacrylate, butanediol 1,4-diacrylate and trimethylolpropane triacrylate are suitable as crosslinking agents.

The present invention therefore also relates to a method in which the dye-containing polymer dispersions contain fluorescent dyes which absorb and emit in the wavelength range from 200 nm to 1400 nm.

Fluorescent dyes are known to the person skilled in the art. They are described, for example, in WO-A-99/40123, page 10, line 14 to page 25, line 25, and in EP-B-0 692 517, page 3, line 7 to page 6, line 1, mentioned in connection with the prior art. Preferably suitable fluorescent dyes belong, for example, to the class consisting of the coumarin, perylene, terrylene, quaterrylene, naphthalimide, cyanine, xanthene, oxazine, anthracene, naphthacene, anthraquinone or thiazine dyes. Preferably used fluorescent dyes are those which have a higher solubility in the oil phase than in the aqueous phase of the oil-in-water emulsion. For example, the dyes should have a solubility of at least 0.001% by weight, preferably of at least 0.01% by weight, in the oil phase.

The invention also relates to the use of aqueous dispersions of polymers which are obtainable by free radical suspension polymerization or by free radical miniemulsion polymerization of ethylenically unsaturated monomers in an oil-in-water emulsion, the disperse phase of which contains at least one fluorescent dye dissolved in at least one ethylenically unsaturated monomer and has a mean particle diameter of at least 10 nm, in the presence of at least one surface-active compound and at least 0.5% by weight, based on the monomers, of at least one hydrophobic, nonpolymerizable, organic compound, of a hydrophobic polymer of at least one $C_2$- to $C_6$-olefin having a molar mass $M_w$ of up to 10 000, of a siloxane having a molar mass $M_w$ of up to 5000 and/or polystyrene having a molar mass $M_w$ of up to 10 000, and of the powders obtainable from these polymer dispersions in each case by drying and containing at least one fluorescent dye for the marking of materials.

B. J. Battersby, G. A. Lawrie, A. P. R. Johnston and M. Trau report, in Chem. Commun., 2002, 1435-1441, on optical coding of colloidal suspensions with fluorescent dyes, nanocrystals and metals. Thus, for example, colloids having a diameter of 3 to 6 µm were optically marked by incorporation of fluorescent dyes or of complexed lanthanides. Another method of marking of colloids consists in the incorporation of zinc sulphide which is provided with cadmium selenide nanocrystals or in the electrochemical deposition of metal ions in cavities of colloids. The colloids can be distinguished from one another, for example, with the aid of a fluorescence microscope or a cytometer.

U.S. Pat. No. 3,772,099 discloses the coding of explosives with the aid of an inorganic phosphor, for example a finely divided, commercial phosphor and a finely divided phosphor doped with at least one element of the lanthanide group of the Periodic Table of the Elements being mixed with an aqueous potassium silicate solution, and the mixture being dried, ground and screened. The particle size of the conglomerate thus formed is 0.5 to 0.7 mm, while the particle size of the phosphors is in the range from 6 to 8 µm. Such a conglomerate can, for example, be carefully mixed with the explosive during the production of dynamite. Amounts of only 0.01% by weight are sufficient for marking an explosive. Even after a detonation using collected samples, the explosives thus marked can be identified with the aid of the emission lines which the coded phosphors emit, for example, on exposure to ultraviolet light. Owing to the different doping of the phosphors, there is a large number of possible combinations, so that the manufacturer, the year, the month and the week of manufacture of an explosive marked in a suitable manner with a plurality of doped phosphors can be determined.

U.S. Pat. No. 4,390,452 discloses coded microparticles for the retrospective identification of substances which contain such microparticles. The coded microparticles are obtained by applying visually distinguishable colour layers in succession, according to the teaching of DE-A-26 51 528, to a carrier film and then producing, on the surface of the composite, with the aid of a diazotization process, a very thin layer in which, by exposure to UV light which strikes this layer through a positive containing microdata, numbers and symbols which can be microscopically evaluated are present after development. Microparticles which are not larger than 1000 µm and which have two flat, parallel surfaces which contain the applied numbers and symbols are produced from the coating. The microparticles are used for the marking of substances, e.g. explosives, in order retrospectively to detect the origin and production data on the product.

WO-A-03/044276 relates to security paper and security articles having at least one security element based on at least one photoluminescent segment which is at least partially incorporated in a paper product which consists of 30 to 99% by weight of dry fibres and 70 to 1% by weight of filler. The security element can be produced, for example, by colouring a carrier comprising cellulose fibres with a photoluminescent dye. The photoluminescence is visible if the security element is exposed to light of a wavelength from 200 to 500 nm.

WO-A-02/46528 discloses the application of a marking serving for security on a substrate, such as paper, ceramic or polymer, as a coating, the binder of the coating material containing fluorescent microparticles having a diameter of 0.2 to 2 µm and discrete particles optically distinguishable therefrom and having a diameter of 10 to 20 µm. The coating appears to be of uniform colour when viewed with the naked eye but the discrete particles are distinguishable in colour from the particles having a diameter of 0.2 to 2 µm under great magnification.

U.S. Pat. No. 6,455,157 discloses the use of at least two different groups of microparticles for the marking of products, each microparticle of a group containing a plurality of colour layers which form a code. With the aid of these microparticles, hierarchical coding of products is possible so that, for example, the manufacturer and the product number can be detected on the marked products.

Dye-containing polymer dispersions are known in principle. Thus, EP-A 691 390 and DE-A 44 36 892 describe dye-containing, aqueous polymer dispersions based on ethylenically unsaturated monomers, which are obtainable by preparing a polymeric compound in an organic solvent in a first step, one or more soluble dyes being added to the organic solvent before, during or after the polymerization, and converting the dye-containing polymer solutions obtained in this manner into aqueous polymer dispersions in a second step. Such dye-containing polymer dispersions are, however, still unsatisfactory with regard to the migration stability of the dyes.

EP-A 566 448 describes dye-containing, aqueous polymer dispersions based on ethylenically unsaturated monomers which are obtainable by carrying out a free radical, aqueous emulsion polymerization of ethylenically unsaturated monomers in a first step and impregnating the polymer dispersions thus obtained with a solution of dyes in organic solvents. The polymer dispersions thus obtainable, however, likewise do not have satisfactory migration stability of the dyes. In this document, it is also pointed out that sufficiently water-compatible dyes can also be added during the polymerization.

Specific references to this embodiment are, however, not given in said document. The use of larger amounts of organic solvents, which is required in this procedure, is disadvantageous.

U.S. Pat. No. 4,680,332 likewise recommends the impregnation of aqueous polymer dispersions with solutions of organic dyes in solvents, such as toluene or chlorobenzene, and the impregnation with oil-in-water emulsions of such dye solutions for the preparation of dye-containing polymer dispersions. This procedure, too, does not lead to satisfactory products.

In a preferred embodiment of the invention, the fluorescent dyes are selected from the class consisting of the coumarin, perylene, terrylene, quaterrylene, naphthalimide, cyanine, xanthene, oxazine, anthracene, naphthacene, anthraquinone or thiazine dyes.

The rylene derivative fluorescent dyes are particularly preferred.

The homologous series of naphthalene molecules condensed in the alpha-position are designated as rylene dyes. In addition, two condensed naphthalenes give perylene, three give terrylene, four give quaterrylene. Owing to their high photostability and the high fluorescence quantum yield, these dyes are of particular interest for single-molecule spectroscopic investigations. In addition to p-terphenyl doped with terrylene, in particular polymer films doped with monoimide and diimide derivatives of rylene dyes were used here.

Accordingly, in a third preferred embodiment, the invention relates to a preferred method for the qualitative and quantitative identification and quantification of mass-produced goods in articles by the identification of the mass-produced goods in articles being carried out by detection of the polymer dispersions, preferably by fluorescence microscopy.

By means of fluorescence microscopy, certain fluorescent dyes can be specifically coloured. Fluorescent substances (fluorochromes) which are caused to fluoresce when excited by light of a certain wavelength are present in the preparation to be investigated. The excited fluorochromes emit light which, owing to the Stokes shift, is as a rule of longer wavelength than the exciting light. Excitation and emission light can be optically separated in the same beam path and, owing to their self-fluorescence, the size of the objects to be investigated may, with sufficiently high contrast, be well below the limit of resolution of an optical microscope.

In a preferred embodiment of the present invention, the method for the qualitative and quantitative identification of mass-produced goods is effected in that the identification of the mass-produced goods in articles is carried out by detection of the polymer dispersions, preferably by cytometry.

The identification of the coded microparticles is possible with the aid of commercially available cytometers which contain a built-in fluorescence spectrometer and/or photo detectors with suitable filters. The identification of the coded microparticles is effected, for example, by analysis of the total fluorescence spectrum or of the emitted radiation of individual selected wavelengths, it also being possible for the wavelength of the incident light excited to produce fluorescence to be varied. Cytometers which are suitable for identifying coded microparticles are sold, for example, by Partec GmbH, Otto-Hahn-Str. 32, D-48161.

The invention also relates to the use of aqueous dispersions of polymers which are obtainable by free radical suspension polymerization or by free radical miniemulsion polymerization of ethylenically unsaturated monomers in an oil-in-water emulsion, the disperse phase of which contains at least one fluorescent dye dissolved in at least one ethylenically unsaturated monomer and has a mean particle diameter of at least 10 nm, in the presence of at least one surface-active compound and at least 0.5% by weight, based on the monomers, of at least one hydrophobic, nonpolymerizable, organic compound, of a hydrophobic polymer of at least one $C_2$- to $C_6$-olefin having a molar mass $M_w$ of up to 10 000, of a siloxane having a molar mass $M_w$ up to 5000 and/or polystyrene having a molar mass $M_w$ of up to 10 000, and of the powders obtainable from these polymer dispersions in each case by drying and containing at least one fluorescent dye for the marking of materials.

In a preferred embodiment, the method for the qualitative and quantitative marking of mass-produced goods in articles is carried out by spraying the polymer dispersions onto the mass-produced goods during the production thereof.

In a further preferred embodiment of the invention, fluorescence-marked polymer dispersions according to the invention can be used for the qualitative and quantitative identification of the mass-produced goods in articles.

For the preferred use for the marking of starting materials in the construction industry, preferably concrete, cement, clinker, mortar, renders, sealants, plasticizers and grinding auxiliaries, the fluorescence-marked polymer dispersions or the polymer dispersions containing at least one fluorescent dye can be used for marking.

Accordingly, in a preferred embodiment, the invention relates to construction materials which contain a fluorescence-marked polymer dispersion.

The type and amount of mass-produced material used can be detected in a plurality of ways.

A portable detection device permits purely qualitative detection of the type of mass-produced material by a spectral analysis of its surface. This device can be calibrated for an individual marker species.

The qualitative and simultaneous quantitative determination of the amount of a mass-produced material used for the production of an article is effected by counting the number of marker particles. The starting concentration of the markers in the mass-produced material to be determined must be known.

The detection can be effected by a substantially non-destructive method by fluorescence microscopy of a suitable surface of the article. In addition, a sample of the article can be dissolved in a suitable medium and the marker particles present in the dissolved sample can then be counted by means of cytometry.

The following examples are intended to explain the invention in more detail.

Marking of Construction Materials

EXAMPLE 1

Production of the Test Specimens
Preparation of the Test Specimens with and without Marking Particles In order to determine the recovery rate of the marking substances used in the hardened precast concrete, they were added to a customary concrete mix in different concentrations. The addition was effected together with the mixing water. The content of water in the particle suspension was calculated on the basis of the mixing water of the concrete. For these experiments, a customary ready-mix concrete was used. Mixing was effected in a concrete mixer (Zyklos compulsory mixer) having a mixing capacity of 150 liters at 60 rpm. The fresh concrete was then filled into standard cubes (15×15×15 cm edge length) and hardened under standard climatic conditions. After the hardening (t>7d), the test specimens were investigated with regard to the particle recovery. For the determination of the zero value, test specimens were produced without addition of the marking particles.

The following materials were used for the production of the concrete test specimens:
1. Portland cement CEM I 42.5 R
2. Quartz sand 0.1-0.3 mm
3. Quartz sand 0.3-1.0 mm
4. Sand 0.4 mm
5. Fine rolling rock debris 4/8 mm
6. Gravel 8/16 mm
7. Water
8. Marker dispersions (cf. Table 1)

The concretes were produced by the following mixing procedure:
1. Dry-mix aggregates and cement for 30 seconds
2. Add mixing water and marker dispersions
3. Mix for a further 270 seconds

TABLE 1

Shows the test specimens produced without and with different additions of the marking substance

| Consecutive No. | CEM [kg] | H$_2$O [l/m$^3$] | w/c | Degree of filling 50 l mixer | Solids dose | Required [g] | Actual [g] | [° C.] |
|---|---|---|---|---|---|---|---|---|
| 1 | 300.00 | 174.00 | 0.58 | 60.00% | | | | 22.0 |
| 2 | 300.00 | 174.00 | 0.58 | 60.00% | 0.0002% | 0.07 | 0.07 | 22.1 |
| 3 | 300.00 | 174.00 | 0.58 | 60.00% | 0.0005% | 0.17 | 0.17 | 22.0 |
| 4 | 300.00 | 174.00 | 0.58 | 60.00% | 0.001% | 0.34 | 0.34 | 22.2 |
| 5 | 300.00 | 174.00 | 0.58 | 60.00% | 0.005% | 1.71 | 1.71 | 22.1 |
| 6 | 300.00 | 174.00 | 0.58 | 60.00% | | | | 19.5 |
| 7 | 300.00 | 174.00 | 0.58 | 60.00% | 0.0002% | 0.04 | 0.04 | 20.2 |
| 8 | 300.00 | 174.00 | 0.58 | 60.00% | 0.0005% | 0.10 | 0.10 | 20.2 |
| 9 | 300.00 | 174.00 | 0.58 | 60.00% | 0.001% | 0.21 | 0.21 | 19.8 |
| 10 | 300.00 | 174.00 | 0.58 | 60.00% | 0.005% | 1.03 | 1.03 | 20.1 | w/c: ratio of water to cement
CEM: Portland cement CEM I 42.5 R

EXAMPLE 2

Addition During Grinding

In order to determine the recovery rate of the marking substances used after strong mechanical stress as occurs during cement production, said marking substances were added to a customary Portland cement clinker (PC clinker) in various concentrations during the grinding (cf. Table 2). The addition was effected before the beginning of the grinding process as a dispersion of the particles to the cement clinker. The grinding was effected in a planetary ball mill from Fritsch (Pulverisette 4). A grinding bowl as well as grinding balls consisted of hardened steel. The diameter of the grinding balls was 20 mm here. The weight of millbase taken, i.e. of Portland cement clinker, was 130 g. Portland cement clinker was precrushed to a grade of <5 mm before the start of the grinding process. The chosen duration of grinding was 15±1 minute. A fineness of grinding of 4000±200 cm$^2$/g was achieved therewith, which corresponds to the fineness of a commercially available CEM I 42.5 R. For determining the zero value, samples were produced without addition of the marking particles.

TABLE 2

Shows the grinding samples produced without and with various additions of the marking substance

| Consecutive No. | PC clinker [g] | Marker | Solids dose | Required [g] | Dilution factor of the dispersion | Actual [g] |
|---|---|---|---|---|---|---|
| 1 | 130.00 | Zero mix | | | | |
| 2 | 130.00 | Marker GK 2465/50 (26.30%) | 0.0002% | 0.0010 | 1:10 | 0.0131 |
| 3 | 130.00 | Marker GK 2465/50 (26.30%) | 0.0010% | 0.0049 | 1:10 | 0.0476 |
| 4 | 130.00 | Marker GK 2465/50 (26.30%) | 0.0050% | 0.0247 | 1:10 | 0.2503 |
| 5 | 130.00 | Marker GK 2465/50 (26.30%) | 0.0100% | 0.0494 | 1:1 | 0.0467 |
| 6 | 130.00 | Marker GK 2465/50 (26.30%) | 0.0200% | 0.0989 | 1:1 | 0.0952 |
| 7 | 130.00 | Zero mix | | | | |
| 8 | 130.00 | Marker GK 2465/162 (43.90%) | 0.0002% | 0.0006 | 1:100 | 0.0600 |
| 9 | 130.00 | Marker GK 2465/162 (43.90%) | 0.0010% | 0.0030 | 1:10 | 0.0301 |
| 10 | 130.00 | Marker GK 2465/162 (43.90%) | 0.0050% | 0.0148 | 1:10 | 0.1533 |
| 11 | 130.00 | Marker GK 2465/162 (43.90%) | 0.0100% | 0.0296 | 1:10 | 0.3003 |

TABLE 2-continued

Shows the grinding samples produced without and with various additions of the marking substance

| Consecutive No. | PC clinker [g] | Marker | Solids dose | Required [g] | Dilution factor of the dispersion | Actual [g] |
|---|---|---|---|---|---|---|
| 12 | 130.00 | Marker GK 2465/162 (43.90%) | 0.0200% | 0.0592 | 1:10 | 0.5934 |

Marker GK = Polymer dispersion with Lumogen Rosa 285

EXAMPLE 3

Recovery of Fluorescence-Marked Polymer Particles in Concrete

Polymer particles (d=3 μm) coloured with Lumogen Rosa 285 were mixed into concrete in a mass ratio of 25/615/1291/6333 μg/kg and poured to give a cube having an edge length of 15 cm. After hardening of the concrete, a sample was taken by drilling (12 mm HILTI TE24 masonry drill). The mass of the drilling dust removed was about 20 g.

5 g of this drilling dust were weighed into a 100 ml conical flask and made up to 100 g with 1 M HCl. This suspension was then stirred for 2 h at 500 rpm with a magnetic stirrer (IKAMAG RET-G). Thereafter, the sample settled out for 2 minutes. The supernatant was taken off for measurement by means of a pipette.

A concentration series of particles coloured with Lumogen Rosa 285 in demineralized water serves as a required value. The analysis of the particles in demineralized water and in the supernatant of the samples was effected using an LSR II flow cytometer from BD-Biosciences.

The measuring parameters of the device were set so that two fluorescence ranges were used for detecting the signals. The excitation of the dye was effected at a wavelength of 488 nm. The fluorescence was measured by bandpass filters at 575 nm±13 nm and 530 nm±15 nm.

The two fluorescence ranges were plotted against one another in a 2-dimensional diagram. All particles which were detected and lie in a predefined marking were summed. The signals of the coloured polymer particles were measured over a period of 1 minute.

For determining the number of particles as a function of the amount of solid added, a concentration series of the particles in demineralized water was first prepared. The total number of particles after 1 minute in the predetermined range is plotted as a function of the mass concentration to give a calibration line, and the linear trend is calculated and presented. The slope is regarded as the required value (100% value).

Analogously to this measurement, the measurement of the particles extracted from the concrete in the supernatant of the concrete samples is effected. Finally, the number of particles in concrete is related to the number of particles in demineralized water. The resulting value corresponds to the recovery rate of the fluorescent particles in concrete. The interpolated recovery rate in this case was 93%.

A table in which the number of particles of the calibrated values was standardized to the concentrations of the measured values of the marked concrete is shown in Table 3.

TABLE 3

Presentation of the results in table form

| | Number of particles (n/min) | | |
|---|---|---|---|
| c (μg/kg) | Demineralized water | Concrete | Recovery (%) |
| 1.24 | 99 | 53 | 54 |
| 30.75 | 2186 | 2146 | 98 |
| 64.55 | 4515 | 3637 | 81 |
| 316.65 | 22643 | 20945 | 93 |

Owing to the stronger weighting of the recovery rate at higher concentrations, the graphical evaluation is more exact and therefore preferable to the table form.

EXAMPLE 4

Recovery of Fluorescence-Marked Polymer Particles in Ground Clinker

Polymer particles (d=3 μm) coloured with Lumogen Rosa 285 were ground in a mass ratio of 200 mg/kg in Allmendinger clinker on a planetary ball mill (Pulverisette 4-20 mm System) over a period of 15 minutes. The analysis of the cement powder was then carried out analogously to Example 1, it having been possible to detect the particles in a corresponding manner.

EXAMPLE 5

Recovery of Fluorescence-Marked Polymer Particles in Tile Adhesive

Polymer particles (particle size ~3 μm) coloured with Lumogen Rosa 285 were mixed in a mass ratio of 2 mg/kg into tile adhesive (PCI-Nanolight) and spread to give an about 5 mm film. After hardening of the tile adhesive, the film was picked up and pulverized in a mortar.

5 g thereof were weighed into a 100 ml conical flask and made up to 100 g with 1 M HCl. This suspension was stirred without interruption for 35 days at 500 rpm on an IKAMAG RET-G magnetic stirrer and then allowed to settle out for 2 min.

The supernatant was measured using the LRS II flow cytometer from BD-Biosciences. As a reference for the particles present in the tile adhesive, particles coloured with Lumogen Rosa 285 were prepared in demineralized water in a mass concentration of 100 μg/kg. The detection was effected over 2 fluorescence ranges. The excitation of the dye was effected at a wavelength of 488 nm. The signals of the coloured polymer particles were measured over a period of 1 minute.

The fluorescence was measured by bandpass filters at 575 nm±13 nm and 530 nm±15 nm. The two fluorescence ranges were plotted against one another in a 2-dimensional diagram. All detected particles which lie in the predefined marking were then summed to give a total number.

For determining the required values (100% value), the reference sample of the coloured particles in demineralized water was measured. The measurement of the total number of particles after 1 minute was regarded as the required value. Analogously to this measurement, the measurement of the particles in the supernatant of the tile adhesive samples was effected. Finally, the number of particles in tile adhesive is related to the number of particles in demineralized water. The resulting value corresponds to the recovery rate of the fluorescent particles in tile adhesive. The recovery rate was 72%.

TABLE 4

Presentation of the results as a table

| c (μg/kg) | Number of particles (n/min) | | Recovery (%) |
|---|---|---|---|
| | Demineralized water | Tile adhesive | |
| 100 | 7020 | 5035 | 72 |

EXAMPLE 6

Addition of the Marker after the Grinding
a. Spray-Dried Powder

The capsule powder according to the invention is obtained, for example, by spray-drying the marker particle dispersions. Preferably, the spraying of the aqueous polymer dispersion is effected in a warm airstream by means of one-fluid nozzles. The droplet size at the exit is chosen to give a microcapsule powder in which the powder particles have a mean particle size in the range of 150-400 μm and 80% by weight of the particles have a size of ≥90 μm. The person skilled in the art chooses the diameter of the nozzle and the admission pressure of the material stream depending on the viscosity of the capsule dispersion. The higher the admission pressure, the smaller are the droplets produced. Usually, the microcapsule dispersion is fed in the range of 2-200 bar. Advantageously, a one-fluid nozzle having a vortex generator is used. Drop size and spray angle can additionally be influenced via the choice of the vortex generator. For example, it is possible to use one-fluid nozzles from Delavan, which have a typical structure consisting of vortex chamber, which influences the spray angle, and perforated plate, which influences the throughput.

In general, a procedure is adopted in which the entry temperature of the warm airstream is in the range from 100 to 200° C., preferably 120 to 180° C., and the exit temperature of the warm airstream is in the range from 30 to 110° C., preferably 50 to 90° C. The temperature difference between entry and exit temperature is preferably at least 50° C., preferably at least 60° C. and particularly preferably at least 70° C. The deposition of the fine particles from the gas stream is usually effected with the use of cyclones or filter separators. The fine particles are preferably redispersed and are recycled to the material stream. The sprayed aqueous polymer dispersion and the warm airstream are preferably led in parallel.

According to a variant of the method, it is possible to connect a fluidized bed downstream of the dryer in order to discharge any residual moisture. Methods in which a fluidized-bed drying means is connected to the spray drying are preferred since they lead to a microcapsule powder having a smaller fine fraction. For example, dryers from Anhydro, Miro or Nubilosa, which have tower heights of 12-30 meters and widths of 3 to 8 meters can be used as the spray tower. The throughput of dry air for such spray towers is typically in the range of 20-30 t/h. The throughput of marker dispersion is then as a rule 1 to 1.5 t/h.
Example of Spray Drying A nozzle combination having three one-fluid nozzles was used. The components of the nozzle combination from Delavan are firstly the vortex chamber and secondly the perforated plate for influencing the throughput in the case of given tower parameters. The spray tower has a diameter of 5 m with a height of 24 m and is operated at a reduced pressure of 0.5-3 mbar, measured at the middle of the tower, by the cocurrent method with up to 25 t/h of dry air heated by means of steam. The temperature difference of the drying is about 70° C., the product discharge temperature being about 25° C. as a result of "aftertreatment". The product discharge is effected via cyclones. The cyclone product (fine fraction) is redispersed and fed in again. A marker particle dispersion having a viscosity of ~200 mPas, measured in a Brookfield viscometer, was sprayed at an admission pressure of 20 to 28 bar via the nozzle combination.

Polymer particles (d=3 μm) spray-dried and coloured with Lumogen Rosa 285 were mixed in a mass ratio of from 1 to 6500 μg/kg in cement powder CEM I 42.5. With this cement powder, concrete cubes having an edge length of 15 cm were cast according to those in Example 1. After hardening of the concrete, a sample was taken by drilling (12 mm HILTI TE24 masonry drill). The mass of the drilling dust taken was about 20 g. The cytometric recovery rates after sample preparation analogous to Example 3 were 21 to 98%.

EXAMPLE 7

Dispersion Applied to Carrier

Polymer particles (d=3 μm) coloured with Lumogen Rosa 285 were mixed in a mass ratio of 100 mg/kg with gypsum. 1 g of the gypsum containing the marker particles was mixed with 999 g of CEM I 42.5. 5 g of the powder obtained were worked up analogously to Example 3. The cytometric recovery rate of the marker was 83%.

EXAMPLE 8

Qualitative and Quantitative Detection by Means of Fluorescence Microscopy

The preparation of the sample consists in the production of a fresh fragment of the concrete and mortar. The fresh fracture surface should have a small region of a few square millimeters which has slight unevenness, which is advantageous for the detection. The detection of the different markers is effected by the spectrally resolved measurement of the fluorescence of each individual marker particle within the image section. The image section is scanned point by point using a laser scanning microscope. A suitably selected laser is focused onto the sample to be investigated and a selected sample area is scanned with the laser focus. If the focus encounters a marker particle, the marker is caused to fluoresce by excitation by the laser. The fluorescence produced is detected spectrally. The scanning of the sample gives, at each point of the sample where a marker particle is present, a spectrum of the fluorescence as a signal which is characteristic for the marker. Marker particles which contain the same marker dyes give the same characteristic spectral signal, and marker particles with other marker dyes give another distinguishable signal characteristic for them. In this way, which markers are present in the sample is determined (qualitative detection). If the respective number is also determined in the selected image section (sample section) in addition to the type of marker particles present, the concentration of the respective marker particles can be determined from the knowledge of the image section and the depth of reading (quantitative detection).

EXAMPLE 9

Practical Test: Metered Addition to the Air Slide During Cement Production

A polymer dispersion is metered into a cement air slide through a spray nozzle by means of a screw delivery pump. The polymer particles present in the dispersion are a mixture of 64 parts of those comprising 0.12% by weight of Lumogen F Yellow 083, of 8 parts of those comprising 0.12% by weight of a 1:1 mixture of Lumogen F Red 305 and Lumogen F Orange 240, and of one part of those comprising 0.12% by weight of Lumogen F Pink 285. The dispersion contains a solids content of 17% and is sprayed at 10 liters per hour into the air slide, in which 25 tonnes of cement per hour are being transported. In this way, 68 ppm of coloured polymer particles are added to the cement. For analysis, about 50 meters away from the metering site, at intervals of 20 minutes, cement samples each of one kilogram are taken from the air slide. The cement is analysed by means of optical fluorescence microscopy, from which the colour code can be found. In addition, 1 gram of cement is homogenized in 100 grams of 1 molar hydrochloric acid by means of a magnetic stirrer and then dissolved at 40° C. in an ultrasound bath for 15 minutes. The solution is analysed by means of a BD Biosciences LSR II multichannel cytometer for 60 seconds. The number of fluorescence events which are registered by the instrument during the measurement corresponds on average to the number of particles added to the cement and thus allows quantification. The customary two-dimensional plot according to intensity in the two measurement channels at 530 nm and 575 nm allows an exact assignment of the fluorescent dye. The test result correctly represents the colour mixture used.

EXAMPLE 10

Practical Test: Metered Addition to the Clinker Metering Stream During Cement Production A polymer dispersion analogous to Example 9 with a solids content of 33% is applied at a constant rate of 5 liters per hour to a clinker metering stream of 25 tonnes per hour. Immediately after application of the polymer dispersion, the clinker is transferred to a ball mill in which the clinker is ground to cement with additives at a maximum of 140° C. Cement samples are taken from the downstream cement air slide analogously to Example 9 and, as in Example 9, analysed for fluorescent particles. The fluorescent particles detected correspond, with deviations of less than 10%, to the amount applied to the clinker. The ratios of the colours used can be found quantitatively.

EXAMPLE 11

Practical Test: Production of Concrete Specimens and Analysis of the Marked Cement The marked cement described in Example 10 was mixed in a ratio of 1 part by weight of water, 2 parts by weight of cement and 10 parts by weight of admixture, and poured into a mould. After the concrete had set, 5 g were pulverized, admixed with 100 ml of 1 molar HCL and digested and analysed according to Example 9. The fluorescent particles detected correspond to the amount metered in. The ratios of the colours used were found.

The invention claimed is:

1. Method for identifying and quantifying mass-produced goods in articles, wherein a dye-containing polymer dispersion was added to the mass-produced goods, wherein particles are coded by a mixture of dyes and the polymer dispersion particles are quantitatively determined.

2. Method according to claim 1, wherein the mass-produced goods comprise liquid and solid mass-produced goods.

3. Method according to claim 1, wherein the liquid mass-produced goods comprise concrete plasticizers or grinding auxiliaries.

4. Method according to claim 1, wherein the solid mass-produced goods contain concrete, cement or clinker.

5. Method according to claim 1, wherein the polymer dispersion has a particle size distribution with a mean diameter of 50 nm to 500 µm.

6. Method according to claim 1, wherein the polymer dispersion is selected from the hydrophobic monomers of the group consisting of $C_1$- to $C_{18}$-alkyl esters of acrylic acid, $C_1$- to $C_{18}$-alkyl esters of methacrylic acid, vinyl acetate, vinyl propionate, vinyl butyrate, styrene, chlorostyrene, α-methylstyrene, methacrylates, maleic acid and a combination of these monomers.

7. Method according to claim 1, wherein the dye-containing polymer dispersion contains fluorescent dyes which absorb and emit in the wavelength range from 200 nm to 1400 nm.

8. Method according to claim 7, wherein the fluorescent dyes are selected from the class consisting of the coumarin, perylene, terrylene, quaterrylene, naphthalimide, cyanine, xanthene, oxazine, anthracene, naphthacene, anthraquinone and thiazine dyes.

9. Method according to claim 7, wherein the fluorescent dyes comprise rylene derivatives.

10. Method for the qualitative and quantitative identification and quantification of mass-produced goods in articles according to claim 1, wherein the identification of the mass-produced goods in articles is carried out by detection of the polymer dispersion, optionally by fluorescence microscopy.

11. Method for the qualitative and quantitative identification of mass-produced goods in articles according to claim 1, wherein the identification of the mass-produced goods in articles is carried out by detection of the polymer dispersion, optionally by cytometry.

12. Method for the qualitative and quantitative marking of mass-produced goods in articles according to claim 1 by means of spraying the polymer dispersion onto the mass-produced goods during the production thereof.

13. Construction materials containing a fluorescence-marked polymer dispersion, according to any of claim 7.

14. Construction materials according to claim 13, comprising concrete, cement, clinker, mortar, renders, sealants, plasticizers or grinding auxiliaries.

15. Method according to claim 1, wherein the polymer dispersion contains at least one fluorescent dye and is used for marking starting materials in the construction industry.

16. Method according to claim 15, wherein the starting materials comprise concrete, cement, clinker, mortar, renders, sealants, plasticizers or grinding auxiliaries.

* * * * *